United States Patent [19]
Levy et al.

[11] Patent Number: 4,802,085
[45] Date of Patent: Jan. 31, 1989

[54] APPARATUS AND METHOD FOR DETECTING AND HANDLING MEMORY-MAPPED I/O BY A PIPELINED MICROPROCESSOR

[75] Inventors: Simon J. Levy, Kfar Saba; Donald B. Alpert, Herzlia, both of Israel

[73] Assignee: National Semiconductor Corporation, Santa Clara, Calif.

[21] Appl. No.: 6,012

[22] Filed: Jan. 22, 1987

[51] Int. Cl.[4] .................................................. G06F 3/00
[52] U.S. Cl. .................................................. 364/200
[58] Field of Search ... 364/200 MS File, 900 MS File

[56] References Cited
U.S. PATENT DOCUMENTS

| | | | |
|---|---|---|---|
| 4,305,124 | 12/1981 | Marro et al. | 364/200 |
| 4,365,311 | 12/1982 | Fukunaga et al. | 364/900 |
| 4,371,927 | 2/1983 | Wilhite et al. | 364/200 |
| 4,498,136 | 2/1985 | Sproul, III | 364/200 |
| 4,547,848 | 10/1985 | Nishida et al. | 364/200 |
| 4,580,238 | 4/1986 | Sawada | 364/736 |

Primary Examiner—Gareth D. Shaw
Assistant Examiner—Jonathan C. Fairbanks
Attorney, Agent, or Firm—Limbach, Limbach & Sutton

[57] ABSTRACT

A method for detecting and handling memory-mapped I/O in a pipelined data processing system is provided. The method uses two signals on the system interface: when the system generates a read bus cycle, it activates an output signal if certain I/O requirements are not satisfied; an input signal is activated when the reference is to a peripheral device that exhibits certain characteristics; when the system detects that both the input signal and the output signal are active, it discards the data read during the bus cycle, serializes instruction execution and regenerates the read bus cycle, this time satisfying the requirements for I/O such that the output signal is driven inactive.

5 Claims, 12 Drawing Sheets

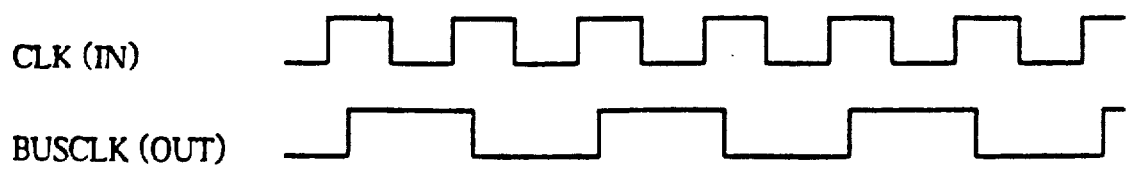
FIG_7
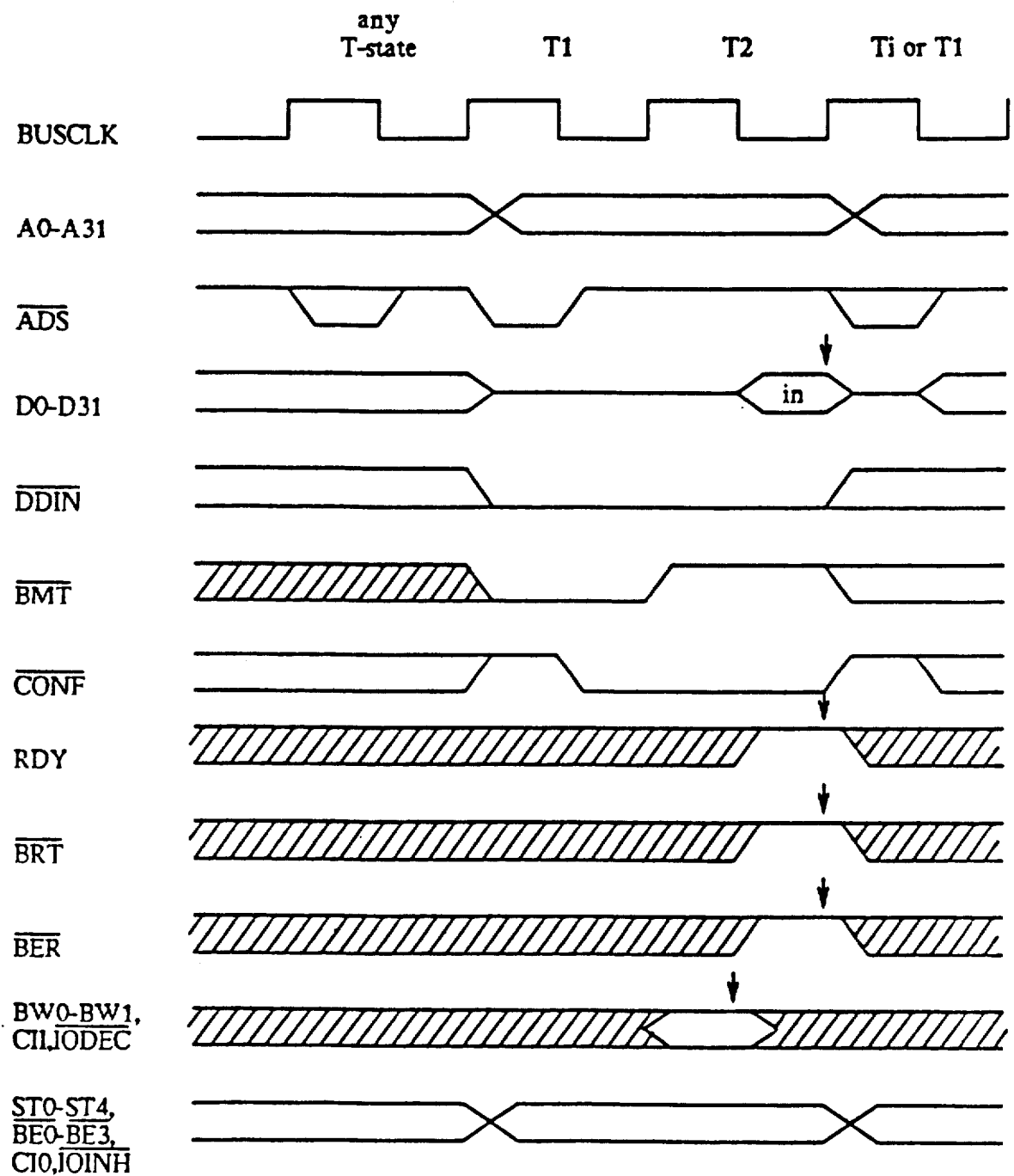
FIG_8

APPARATUS AND METHOD FOR DETECTING AND HANDLING MEMORY-MAPPED I/O BY A PIPELINED MICROPROCESSOR

BACKGROUND OF THE INVENTION

1. Field of the Invention

The present invention relates to data processing systems and, in particular, to the detection and special handling of memory-mapped Input/Output references by a pipelined microprocessor.

2. Discussion of the Prior Art

In conventional digital data processing system architecture, peripheral devices such as modems, printers or displays are accessed by a technique called memory-mapped Input/Output (I/O). According to this technique, control registers within the peripheral device are read and written by the central processing unit by executing the same instructions as those executed for reading and writing ordinary memory locations. There are, however, special characteristics associated with reading and writing certain peripheral devices that differ from the characteristics of reading and writing memory.

For example, reading a control register in a peripheral device can alter the value read on the next reference to the same register or to another register in the same device. Serial communications controllers and First-In-First-Out memories commonly operate in this manner.

Similarly, writing to a control register in a peripheral device can alter the value read from a different register. For example, in the case of National Semiconductor Corporation's NS32202 Interrupt Control Unit, before reading the counter's value from the NS32202, it is first necessary to freeze the counter's value by writing to another control register.

These special characteristics of peripheral devices cause no serious problems in data processing systems which, like currently-available microprocessors, are designed to execute instructions sequentially.

However, more complex, high performance systems execute several instructions simultaneously in a "pipelined" manner. For systems of this type, special handling procedures must be observed for I/O references to ensure that the system's programs execute correctly. For example, a pipelined computer may perform reads and writes to different memory locations in any order, but references to peripheral devices must occur in the specific order implied by the executing program.

Data processing system architectures, such as the architecture of the Hewlett-Packard Spectrum family of computers and the Digital Equipment Corporation VAX-11/750 computer, have been developed that provide for pipelined designs which detect memory-mapped I/O references and apply special handling. In these systems, a portion of the computer's memory address space is dedicated specifically for I/O, thereby restricting the location of peripheral devices to a fixed range of addresses.

While, as just stated, the issue of I/O references has been addressed in microcomputer architecture, currently available microprocessor architectures have not dedicated memory address space for I/O, or in any other manner provided for detecting memory-mapped I/O references. Consequently, it is necessary to provide an architecture to support memory-mapped I/O in microprocessor designs that are pipelined for high performance.

However, it is unacceptable for a microprocessor architecture to rely solely on the above-described method of dedicating a portion of the memory address space for I/O, because that would make the microprocessor incompatible with systems that have already been developed with peripheral devices connected at arbitrary locations.

SUMMARY OF THE INVENTION

It is an object of the present invention to provide a microprocessor architecture which includes a method of detecting and handling memory-mapped I/O references while allowing peripheral devices to be located at arbitrary addresses.

It is also an object of the present invention to provide a method of detecting and handling memory-mapped I/O references that can be applied to any computer or microprocessor that utilizes a pipelined architecture.

These and other objects of the present invention are accomplished by providing a microprocessor which supports a novel method for handling memory-mapped I/O.

The method of the present invention uses two signals on the microprocessor's external interface. When the microprocessor generates a read bus cycle, it also activates an I/O Inhibit output signal if either of the following two requirements are not met: First, reading from a peripheral port can alter the value read on the next reference to the same port, a characteristic referred to as "destructive reading". Since the microprocessor described herein is a pipelined processor, it can read the source operands for one instruction while the previous instruction is still executing. Because the previous instruction may cause a trap, an interrupt may be recognized or the flow of control may be otherwise altered, it is a first requirement that destructive reading of source operands in advance of executing an instruction be avoided. Second, writing to a peripheral port can alter the value read from a different peripheral port, a characteristic referred to as "side-effects of writing". Because of its pipelined architecture, the microprocessor can read source operands for one instruction before writing the results of previous instructions unless the addresses indicate a dependency between read and write references. Therefore, it is a second requirement that read and write references to peripherals that exhibit side effects of writing must occur in the order that instructions are executed.

The I/O Inhibit output indicates that the current bus cycle should be ignored if a peripheral device is addressed.

In addition, an I/O Decode input signal is activated when the reference is to a peripheral device that implements ports with "destructive-reading" or "side-effects-of-writing". The I/O Decode input indicates to the microprocessor that a peripheral device is addressed by the current bus cycle.

When the microprocessor detects that both the I/O Decode input signal and the I/O Inhibit output signal are active, it discards the data read during the bus cycle and serializes instruction execution. The microprocessor then generates the read bus cycle again, this time satisfying the two requirements for I/O and, thus, for driving the I/O Inhibit output signal inactive.

Other objects, features and advantages of the present invention will become apparent and be appreciated by referring to the detailed description provided below which is to be considered in conjunction with the accompanying drawings.

DESCRIPTION OF THE DRAWINGS

FIG. 7 is a timing diagram illustrating the relationship between the CLK input and BUSCLK output signals of the microprocessor described herein.

FIG. 8 is a timing diagram illustrating the basic read cycle of the microprocessor described herein.

DETAILED DESCRIPTION OF A PREFERRED EMBODIMENT

Figure 1:
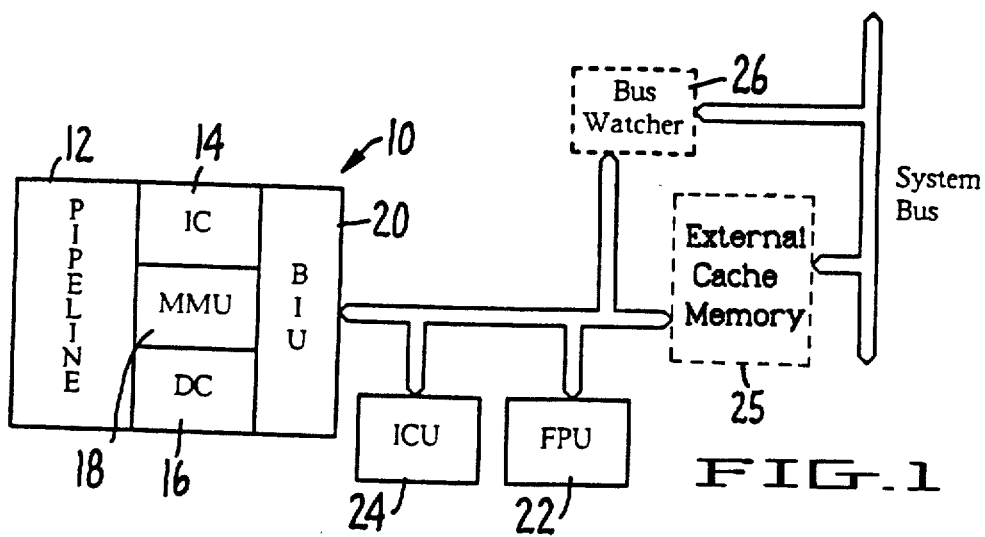
FIG. 1 is a schematic block diagram generally illustrating a microprocessor architecture which implements a method for detecting and handling memory-mapped I/O in accordance with the present invention.

FIG. 1 shows the general architecture of a microprocessor (CPU) 10 which implements a method of detecting and handling memory-mapped Input/Output (I/O) references in a pipelined architecture while retaining the flexibility for connection of peripheral devices at arbitrary locations.

CPU 10 initiates bus cycles to communicate with external memory and with other devices in the computing cluster to fetch instructions, read and write data, perform floating-point operations and respond to exception requests.

CPU 10 includes a 4-stage instruction Pipeline 12 that is capable of executing, at 20 MHz, up to 10 MIPS (millions of instructions per second). Also integrated on-chip with Pipeline 12 are three storage buffers that sustain the heavy demand of Pipeline 12 for instructions and data. The storage buffers include a 512-byte Instruction Cache 14, a 1024-byte Data Cache 16 and a 64-entry translation buffer which is included within a Memory Management Unit (MMU) 18. The primary functions of MMU 18 are to arbitrate requests for memory references and to translate virtual addresses to physical addresses. An integrated Bus Interface Unit (BIU) 20 controls the bus cycles for external references.

Placing the cache and memory management functions on the same chip with instruction Pipeline 12 provides excellent cost/performance by improving memory access time and bandwidth for all applications.

CPU 10 is also compatible with available peripheral devices, such as Interrupt Control Unit (ICU) 24 (e.g., NS32202). The interface of ICU 24 to CPU 10 is completely asynchronous, so it is possible to operate ICU 24 at lower frequencies than CPU 10.

CPU 10 incorporates its own clock generator. Therefore, no timing control unit is required.

CPU 10 also supports both external cache memory 25 as well as a "Bus Watcher" 26, described below, which assists in maintaining data coherence in Instruction Cache 14 and Data Cache 16.

Figure 2:
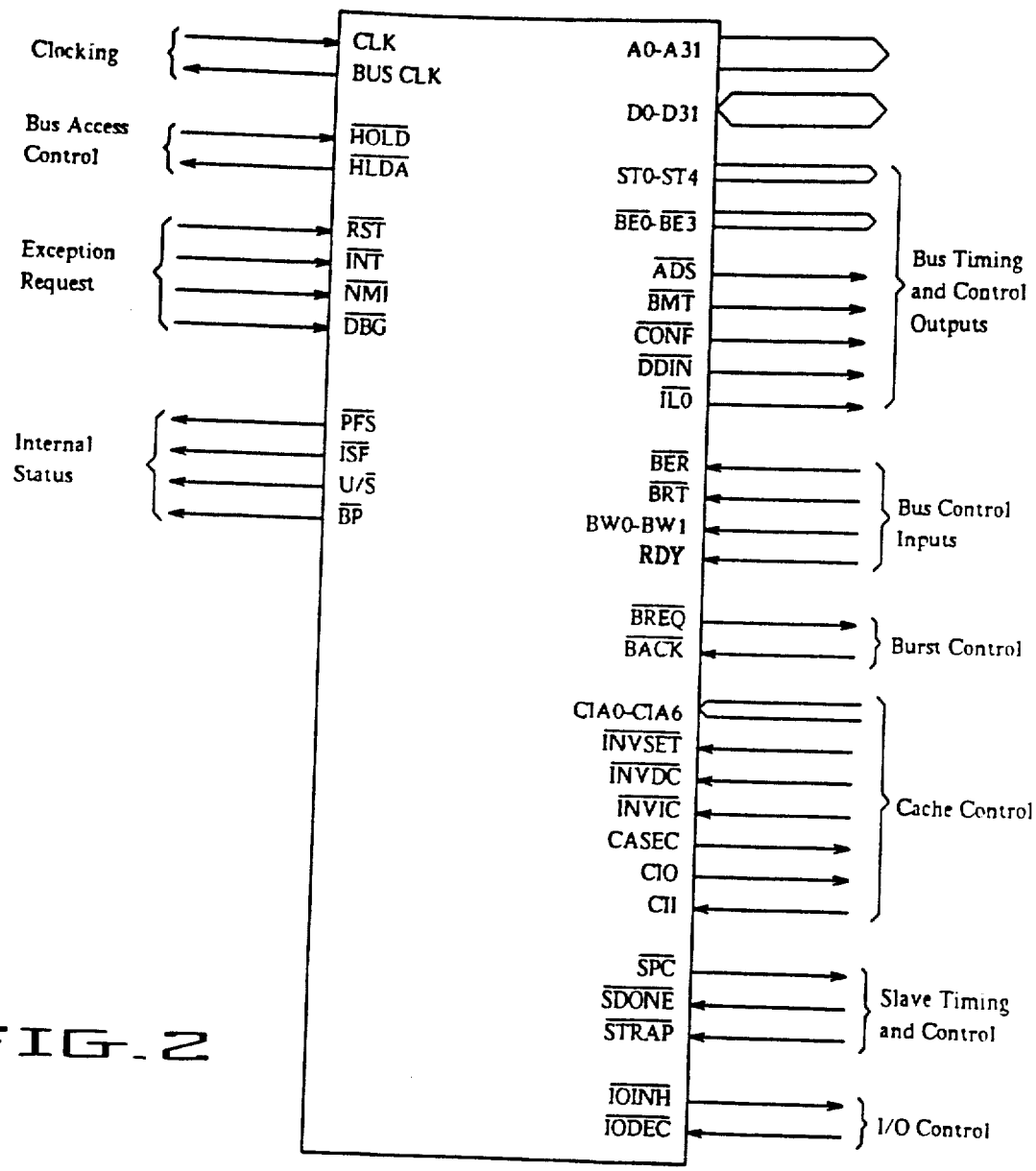
FIG. 2 is a schematic diagram illustrating the interface signals of the microprocessor described herein.

As shown in FIG. 2, CPU 10 has 114 interface signals for bus timing and control, cache control, exception requests and other functions. The following list provides a summary of the CPU 10 interface signal functions:

| Input Signals | |
|---|---|
| $\overline{\text{BACK}}$ | Burst Acknowledge (Active Low). When active in response to a burst request, indicates that the memory supports burst cycles. |
| $\overline{\text{BER}}$ | Bus Error (Active Low). Indicates to CPU 10 that an error was detected during the current bus cycle. |
| $\overline{\text{BRT}}$ | Bus Retry (Active Low). Indicates that CPU 10 must perform the current bus cycle again. |
| BW0–BW1 | Bus Width (2 encoded lines). These lines define the bus width (8, 16 or 32 bits) for each data transfer, as shown in Table 1. |

| BW1 | BW0 | Bus Width |
|---|---|---|
| 0 | 0 | reserved |
| 0 | 1 | 8 bits |
| 1 | 0 | 16 bits |
| 1 | 1 | 32 bits |

Table 1

| | |
|---|---|
| CIA0–CIA6 | Cache Invalidation Address (7 encoded lines) The cache invalidation address is presented on the CIA bus. Table 2 presents the CIA lines relevant for each of the internal caches of CPU 10. |

Input Signals -continued

| CIA (0:4) | Set address in DC and IC |
|---|---|
| CIA (5:6) | Reserved |

Table 2

CII — Cache Inhibit In (Active High).
Indicates to CPU 10 that the memory reference of the current bus cycle is not cacheable.

CINVE — Cache Invalidation Enable.
Input which determines whether the External Cache Invalidation options or the Test Mode operation have been selected.

CLK — Clock.
Input clock used to derive all timing for CPU 10.

DBG — Debug Trap Request (Falling-Edge Activated).
High-to-low transition of this signal causes Trap (DBG).

HOLD — Hold Request (Active Low).
Requests CPU 10 to release the bus for DMA or multiprocessor purposes.

INT — Interrupt (Active Low).
Maskable interrupt request.

INVSET — Invalidate Set (Active Low).
When Low, only a set in the on-chip caches is invalidated; when High, the entire cache is invalidated.

INVDC — Invalidate Data Cache (Active Low).
When low, an invalidation is done in the Data Cache.

INVIC — Invalidate Instruction Cache (Active Low).
When low, an invalidation is done in the Instruction Cache.

IODEC — I/O Decode (Active Low).
Indicates to CPU 10 that a peripheral device is addressed by the current bus cycle.

NMI — Nonmaskable Interrupt (Falling-Edge Activated).
A High-to-Low transition of this signal requests a nonmaskable interrupt.

RDY — Ready (Active High).
While this signal is inactive, CPU 10 extends the current bus cycle to support a slow memory or peripheral device.

RST — Reset (Active Low).
Generates reset exceptions to initialize CPU 10.

SDONE — Slave Done (Active Low).
Indicates to CPU 10 that a Slave Processor has completed executing an instruction.

Input Signals -continued

STRAP — Slave Trap (Active Low).
Indicates to CPU 10 that a Slave Processor has detected a trap condition while executing an instruction.

Output Signals

A0-A31 — Address Bus (3-state, 32 lines)
Transfers the 32-bit address during a bus cycle. A0 transfers the least significant bit.

ADS — Address Strobe (Active Low, 3-State).
Indicates that a bus cycle has begun and a valid address is on the address bus.

BE0-BE3 — Byte Enables (Active Low, 3-state, 4 lines).
Signals enabling transfer on each byte of the data bus, as shown in Table 3.

| BE | Enables Bits |
|---|---|
| 0 | 0-7 |
| 1 | 8-15 |
| 2 | 16-23 |
| 3 | 24-31 |

Table 3

BMT — Begin Memory Transaction (Active Low, 3-State).
Indicates that the current bus cycle is valid, that is, the bus cycle has not been cancelled. Available earlier in the bus cycle than CONF.

BP — Break Point (Active Low).
Indicates that CPU 10 has detected a debug condition.

BREQ — Burst Request (Active Low, 3-state).
Indicates that CPU 10 is requesting to perform burst cycles.

BUSCLK — Bus Clock
Output clock for bus timing.

CASEC — Cache Section (3-state)
For cacheable data read bus cycles, indicates the section of the on-chip Data Cache 18 into which the data will be placed.

CIO — Cache Inhibit (Active High).
Indication by CPU 10 that the memory reference of the current bus cycle is not cacheable; controlled by the CI-bit in the level-2 Page Table Entry.

CONF — Confirm Bus Cycle (Active Low, 3-state).
Indicates that a bus cycle initiated with ADS is valid; that is, the bus cycle has not been cancelled.

DDIN — Data Direction In (Active Low, 3-state).
Indicates the direction of transfers on the data bus; when Low during a bus cycle, indicates that CPU 10 is reading data; when High during a bus cycle, indicates that CPU 10 is writing data.

-continued

Output Signals

| Signal | Description |
|---|---|
| HLDA | Hold Acknowledge (Active Low). Activated by CPU 10 in response to the 1-HOLD input to indicate that CPU 10 has released the bus. |
| ILO | Interlocked Bus Cycle (Active Low). Indicates that a sequence of bus cycles with interlock protection is in progress. |
| IOINH | I/O Inhibit (Active Low). Indicates that the current bus cycle should be ignored if a peripheral device is addressed. |
| ISF | Internal Sequential Fetch. Indicates, along with PFS, that the instruction beginning execution is sequential (ISF = Low) or non-sequential (ISF = High). |
| PFS | Program Flow Status (Active Low). A pulse on this signal indicates the beginning of execution for each instruction. |
| SPC | Slave Processor Control (Active Low). Data Strobe for Slave Processor bus cycles. |
| ST0–ST4 | Status (5 encoded lines). Bus cycle status code; ST0 is the least significant bit. The encoding is shown in Table 4. |
| U/S | User/Supervisor (3 state). Indicates User(U/S = High) or Supervisor (U/S = Low) Mode. |

TABLE 4

| | Bidirectional Signals | |
|---|---|---|
| D0–D31 | Data Bus (3-state, 32 lines). Transfers 8, 16, or 32 bits of data during a bus cycle; D0 transfers the least significant bit. | |

| STATUS | | | | | |
|---|---|---|---|---|---|
| 4 | 3 | 2 | 1 | 0 | DESCRIPTION |
| 0 | 0 | 0 | 0 | 0 | Idle |
| 0 | 0 | 0 | 0 | 1 | Idle: Wait Instruction |
| 0 | 0 | 0 | 1 | 0 | Idle: Halted |
| 0 | 0 | 0 | 1 | 1 | Idle: Waiting for Slave |
| 0 | 0 | 1 | 0 | 0 | Interrupt acknowledge, Master |
| 0 | 0 | 1 | 0 | 1 | Interrupt acknowledge, Cascaded |
| 0 | 0 | 1 | 1 | 0 | End of Interrupt, Master |
| 0 | 0 | 1 | 1 | 1 | End of Interrupt, Cascaded |
| 0 | 1 | 0 | 0 | 0 | Sequential Instruction Fetch |
| 0 | 1 | 0 | 0 | 1 | Non-sequential Instruction Fetch |
| 0 | 1 | 0 | 1 | 0 | Data transfer |
| 0 | 1 | 0 | 1 | 1 | Read Read-Modify-Write Operand |
| 0 | 1 | 1 | 0 | 0 | Read for Effective address |
| 0 | 1 | 1 | 0 | 1 | Access PTE1 by MMU |
| 0 | 1 | 1 | 1 | 0 | Access PTE2 by MMU |
| 0 | 1 | 1 | 1 | 1 | reserved |
| 1 | 0 | 0 | 0 | 0 | reserved |
| 1 | 0 | 0 | 0 | 1 | reserved |
| 1 | 0 | 0 | 1 | 0 | reserved |
| 1 | 0 | 0 | 1 | 1 | reserved |
| 1 | 0 | 1 | 0 | 0 | reserved |
| 1 | 0 | 1 | 0 | 1 | reserved |
| 1 | 0 | 1 | 1 | 0 | reserved |
| 1 | 0 | 1 | 1 | 1 | reserved |
| 1 | 1 | 0 | 0 | 0 | reserved |

TABLE 4-continued

| | Bidirectional Signals | |
|---|---|---|
| D0–D31 | Data Bus (3-state, 32 lines). Transfers 8, 16, or 32 bits of data during a bus cycle; D0 transfers the least significant bit. | |

| STATUS | | | | | |
|---|---|---|---|---|---|
| 4 | 3 | 2 | 1 | 0 | DESCRIPTION |
| 1 | 1 | 0 | 0 | 1 | reserved |
| 1 | 1 | 0 | 1 | 0 | reserved |
| 1 | 1 | 0 | 1 | 1 | reserved |
| 1 | 1 | 1 | 0 | 0 | reserved |
| 1 | 1 | 1 | 0 | 1 | Transfer Slave Processor Operand |
| 1 | 1 | 1 | 1 | 0 | Read Slave Processor Status |
| 1 | 1 | 1 | 1 | 1 | Broadcast Slave ID + Opcode |

Figure 3:
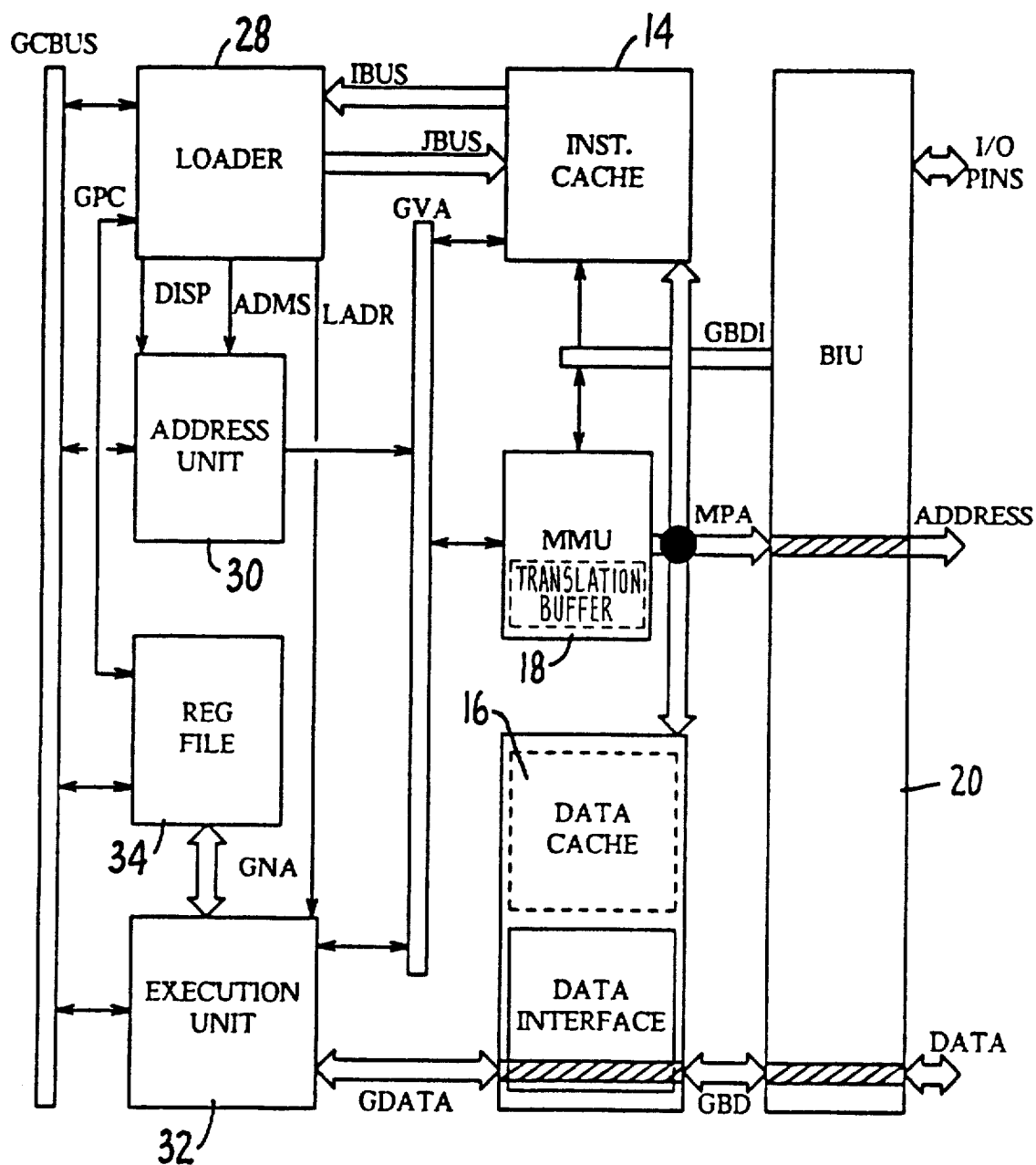
FIG. 3 is a schematic block diagram illustrating the major functional units and interconnecting buses of the microprocessor described herein.

Referring to FIG. 3, CPU 10 is organized internally as eight major functional units that operate in parallel to perform the following operations to execute instructions: prefetch, decode, calculate effective addresses and read source operands, calculate results and store to registers, store results to memory.

A Loader 28 prefetches instructions and decodes them for use by an Address Unit 30 and an Execution Unit 32. Loader 28 transfers instructions received from Instruction Cache 14 on the IBUS bus into an 8-byte instruction queue. Loader 28 can extract an instruction field on each cycle, where a "field" means either an opcode (1 to 3 bytes including addressing mode specifiers), displacement or immediate value. Loader 28 decodes the opcode to generate the initial microcode address, which is passed on the LADR bus to Execution Unit 32. The decoded general addressing modes are passed on the ADMS bus to Address Unit 30. Displacement values are passed to Address Unit 30 on the DISP bus. Immediate values are available on the GCBUS bus.

Address Unit 30 calculates effective addresses using a dedicated 32-bit adder and reads source operands for Execution Unit 32. Address Unit 30 controls a port from Register File 34 to the GCBUS through which it transfers base and index values to the address adder and data values to Execution Unit 32. Effective addresses for operand references are transferred to MMU 18 and Data Cache 16 on the GVA bus, which is the virtual address bus.

Execution Unit 32 includes the data path and the microcoded control for executing instructions and processing exceptions. The data path includes a 32-bit Arithmetic Logic Unit (ALU), a 32-bit barrel shifter, an 8-bit priority encoder, and a number of counters. Special-purpose hardware incorporated in Execution Unit 32 supports multiplication, retiring one bit per cycle with optimization for multipliers of small absolute value.

Execution Unit 32 controls a port to Register File 34 from the GNA bus on which it stores results. The GNA bus is also used by Execution Unit 32 to read values of dedicated registers, like the configuration and interrupt base registers, which are included in Register File 34. A 2-entry data buffer allows Execution Unit 32 to overlap the execution of one instruction with storing results to memory for previous instructions. The GVA bus is used by Execution Unit 32 to perform memory references for complex instructions (e.g., string operations) and exception processing.

Register File 34 is dual-ported, allowing read access by Address Unit 30 on the GCBUS and read/write access by Execution Unit 32 on the GNA bus. Register File 34 holds the general-purpose registers, dedicated registers, and program counter values for Address Unit 30 and Execution Unit 32.

MMU 18 is compatible with the memory management functions of CPU 10. Instruction Cache 14, Address Unit 30 and Execution Unit 32 make requests to MMU 18 for memory references. MMU 18 arbitrates the requests, granting access to transfer a virtual address on the GVA bus. MMU 18 translates the virtual address it receives on the GVA bus to the corresponding physical address, using its internal translation buffer. MMU 18 transfers the physical address on the MPA bus to either Instruction Cache 14 or Data Cache 16, depending on whether an instruction or data reference is being performed. The physical address is also transferred to BIU 20 for an external bus cycle.

Bus Interface Unit (BIU) 20 controls the bus cycles for references by Instruction Cache 14, Address Unit 30 and Execution Unit 32. BIU 20 contains a 3-entry buffer for external references. Thus, for example, BIU 20 can be performing a bus cycle for an instruction fetch while holding the information for another bus cycle to write to memory and simultaneously accepting the next data read.

Figure 4:
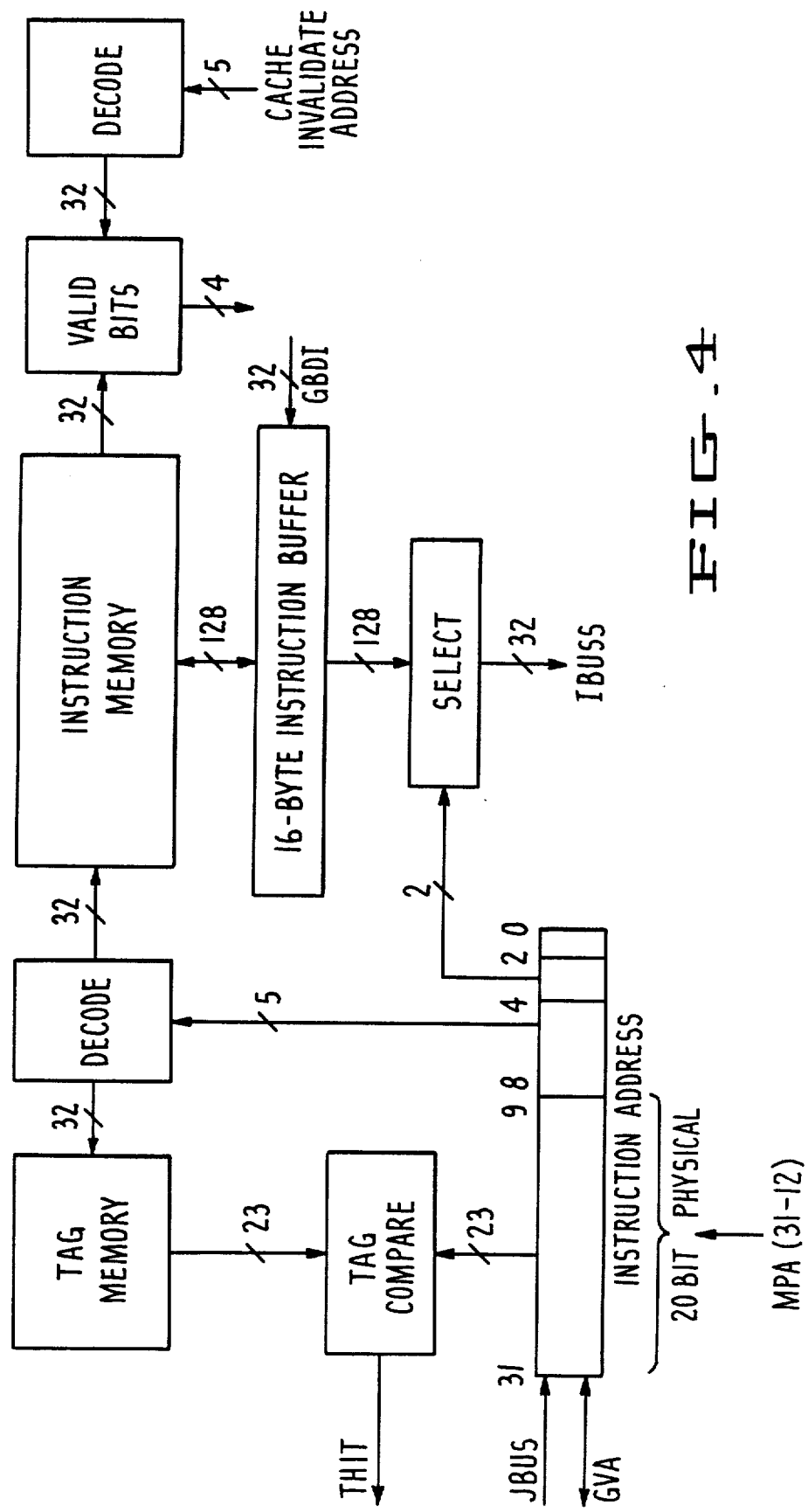
FIG. 4 is a schematic block diagram illustrating the structure of the Instruction Cache of the microprocessor described herein.

Referring to FIG. 4, Instruction Cache 14 stores 512 bytes in a direct-map organization. Bits 4 through 8 of a reference instruction's address select 1 of 32 sets. Each set contains 16 bytes, i.e. 4 double-words, of code and a log that holds address tags comprising the 23 most-significant bits of the physical address for the locations stored in that set. A valid bit is associated with every double-word.

Instruction Cache 14 also includes a 16-byte instruction buffer from which it can transfer 32-bits of code per cycle on the IBUS to Loader 28. In the event that the desired instruciton is found in Instruction Cache 14 (a "hit"), the instruction buffer is loaded from the selected set of Instruction Cache 14. In the event of a miss, Instruction Cache 14 transfers the address of the missing double-word on the GVA bus to MMU 18, which translates the address for BIU 20. BIU 20 initiates a burst read cycle, described below, to load the instruction buffer from external memory through the GBDI bus. The instruction buffer is then written to one of the sets of Instruction Cache 14.

Instruction Cache 14 holds counters for both the virtual and physical addresses from which to prefetch the next double-word of the instruction stream. When Instruction Cache 14 must begin prefetching from a new instruction stream, the virtual address for the new stream is transferred from Loader 28 on the JBUS. When crossing to a new page, Instruction Cache 14 transfers the virtual address to MMU 18 on the GVA bus and receives back the physical address on the MPA bus.

Instruction Cache 14 also supports an operating mode to lock its contents to fixed locations. This feature is enabled by setting a Lock Instruction Cache (LIC) bit in the configuration register. It can be used in real-time systems to allow fast, on-chip access to the most critical routines. Instruction Cache 14 can be enabled by setting an Instruction Cache Enable (IC) bit in the configuration register.

Figure 5:
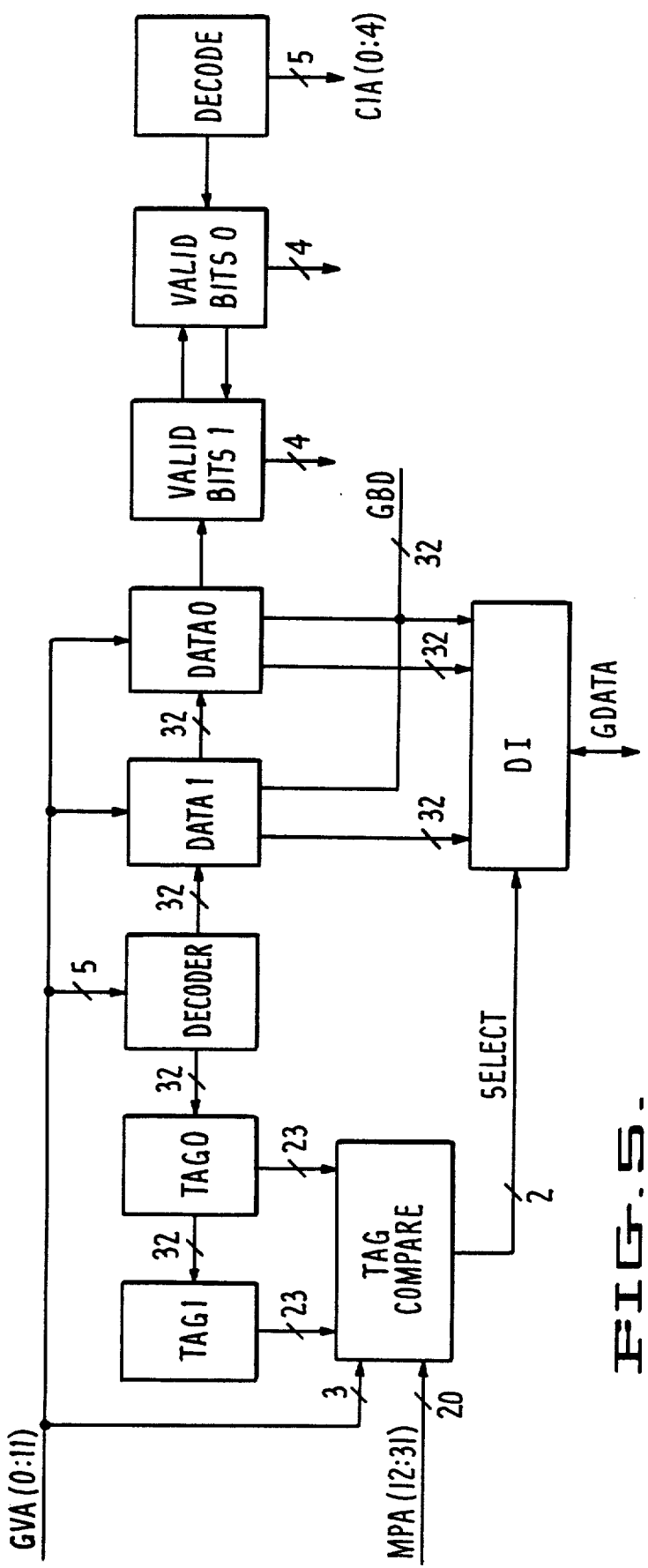
FIG. 5 is a schematic block diagram illustrating the structure of the Data Cache of the microprocessor described herein.

Data Cache 16 stores 1024 bytes of data in a two-way set associative organization, as shown in FIG. 5. Each set has two entries containing 16 bytes and two tags that hold the 23 most significant bits of the physical address for the locations stored in the two entries. A valid bit is associated with every double-word.

Figure 6:
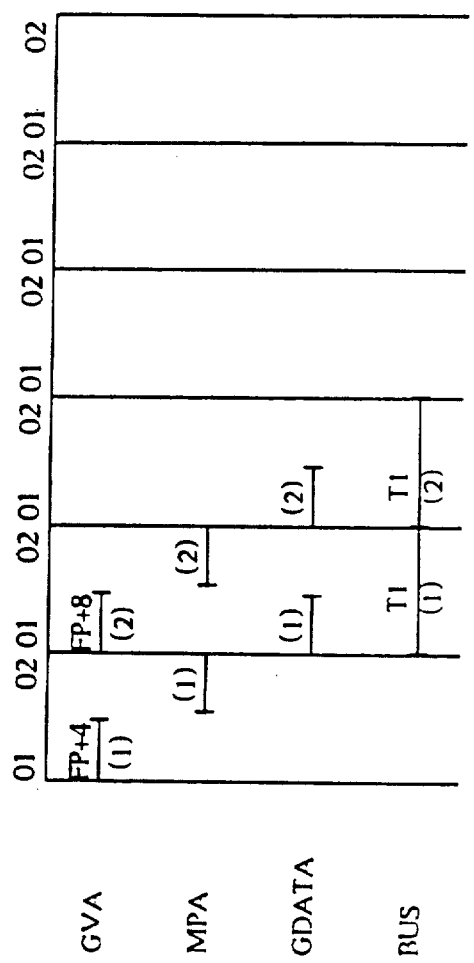
FIG. 6 is a timing diagram illustrating the timing sequence for access to the Data Cache of the microprocessor described herein.

The timing to access Data Cache 16 is shown in FIG. 6. First, virtual address bits 4 through 8 on the GVA bus are used to select the appropriate set within Data Cache 16 to read the two entries. Simultaneously, MMU 18 is translating the virtual address and transferring the physical address to Data Cache 16 and BIU 20 on the MPA bus. Then Data Cache 16 compares the two address tags with the physical address while BIU 20 initiates an external bus cycle to read the data from external memory. If the reference is a hit, then the selected data is aligned by Data Cache 16 and transferred to Execution Unit 32 on the GDATA bus and BIU 20 cancels the external bus cycle by not asserting the BMT and $\overline{\text{CONF}}$ signals. If the reference is a miss, BIU 20 completes the external bus cycle and transfers data from external memory to Execution Unit 32 and to Data Cache 16, which updates its cache entry. For references that hit, Data Cache 16 can sustain a throughput of one double-word per cycle, with a latency of 1.5 cycles.

Like Instruction Cache 14, Data Cache 16 is a write-through cache. For memory write references, Data Cache 16 examines whether the reference is a hit. If so, the contents of the cache are updated. In the event of either a hit or a miss, BIU 20 writes the data through to external memory. Data Cache 16 supports an operating mode to lock its contents to fixed locations. This feature is enabled by setting a Lock Data Cache (LDC) bit in the configuration register. It can be used in real-time systems to allow fast on-chip access to the most critical data locations.

Data Cache 16 can be enabled by setting a Data Cache Enable (DC) bit in the configuration register.

CPU 10 receives a single-phase input clock CLK which has a frequency twice that of the operating rate of CPU 10. For example, the input clock's frequency is 40 MHz for a CPU 10 operating at 20 MHz. CPU 10 divides the CLK input by two to obtain an internal clock that is composed of two non-overlapping phases, PHI1 and PHI2. CPU 10 drives PHI1 on the BUSCLK output signal.

FIG. 7 shows the relationship between the CLK input and BUSCLK output signals.

As illustrated in FIG. 8, every rising edge of the BUSCLK output defines a transition in the timing state ("T-State") of CPU 10. Bus cycles occur during a sequence of T-states, labelled T1, T2, and T2B in the associated timing diagrams. There may be idle T-states (Ti) between bus cycles. The phase relationship of the BUSCLK output to the CLK input can be established at reset.

The basic bus cycles performed by CPU 10 to read from and write to external main memory and peripheral devices occur during two cycles of the bus clock, called T1 and T2. The basic bus cycles can be extended beyond two clock cycles for two reasons. First, additional T2 cycles can be added to wait for slow memory and peripheral devices. Second, when reading from external memory, burst cycles (called "T2B") can be used to transfer multiple double-words from consecutive locations.

Figure 9:
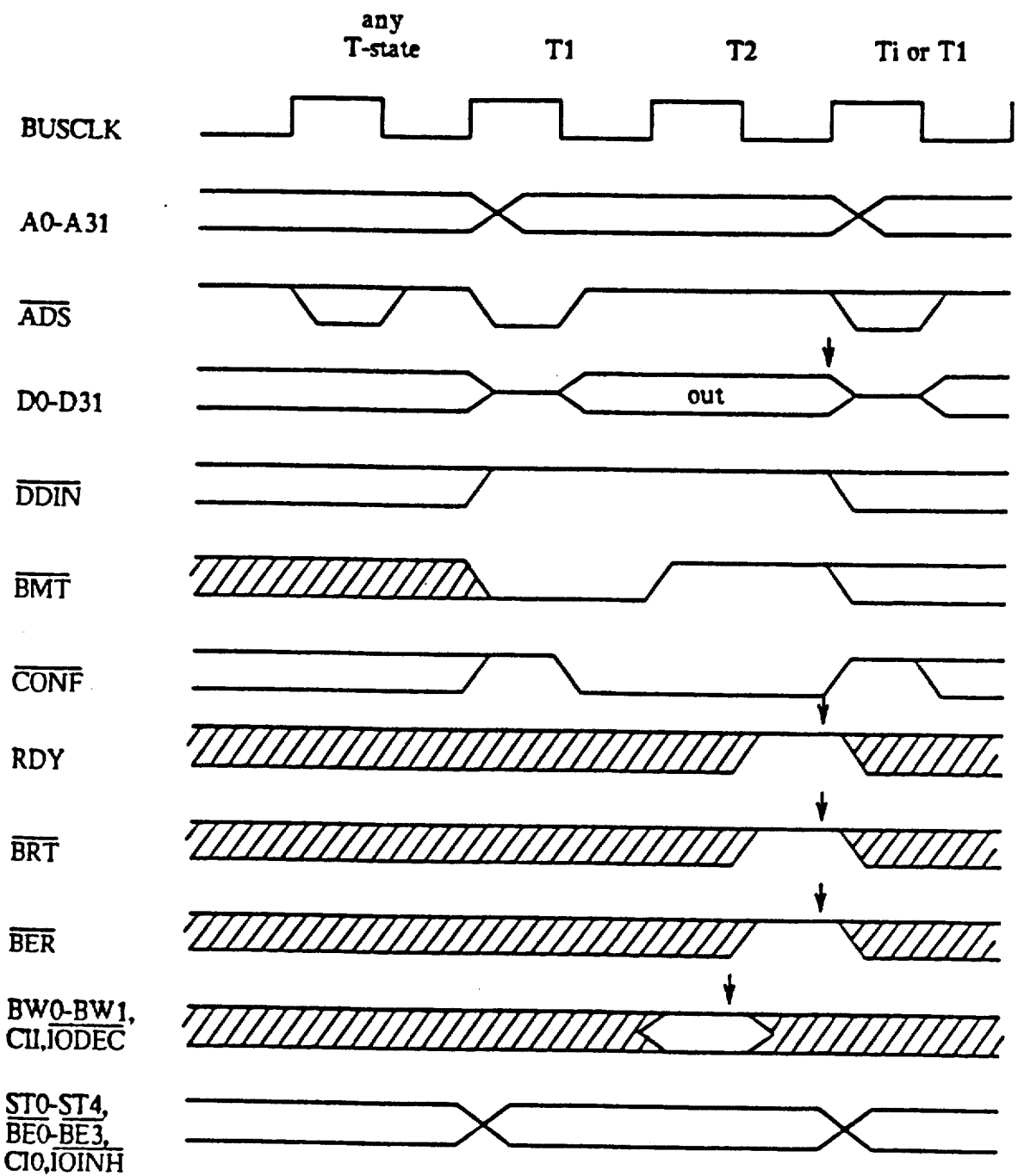
FIG. 9 is a timing diagram illustrating the basic write cycle of the microprocessor described herein.

The timing for basic read and write bus cycles with no "wait" states is shown in FIGS. 8 and 9, respectively. For both read and write bus cycles, CPU 10 asserts Address Strobe $\overline{\text{ADS}}$ during the first half of T1 indicating the beginning of the bus cycle. From the beginning of T1 until the completion of the bus cycle, CPU 10 drives the address bus and control signals for the Status (ST0-ST4), Byte Enable (BE0-BE3), Data Direction In ($\overline{\text{DDIN}}$), Cache Inhibit (CIO), I/O Inhibit ($\overline{\text{IOINH}}$), and Cache Section (CASEC) signals.

If the bus cycle is not cancelled (that is, T2 will follow on the next clock), CPU 10 asserts Begin Memory Transaction $\overline{\text{BMT}}$ during T1 and asserts Confirm Bus Cycle $\overline{\text{CONF}}$ from the middle of T1 until the completion of the bus cycle, at which time $\overline{\text{CONF}}$ is negated.

At the end of T2, CPU 10 samples that RDY is active, indicating that the bus cycle has been completed; that is, no additional T2 states should be added. Following T2 is either T1 for the next bus cycle or Ti, if CPU 10 has no bus cycles to perform.

Figure 10:
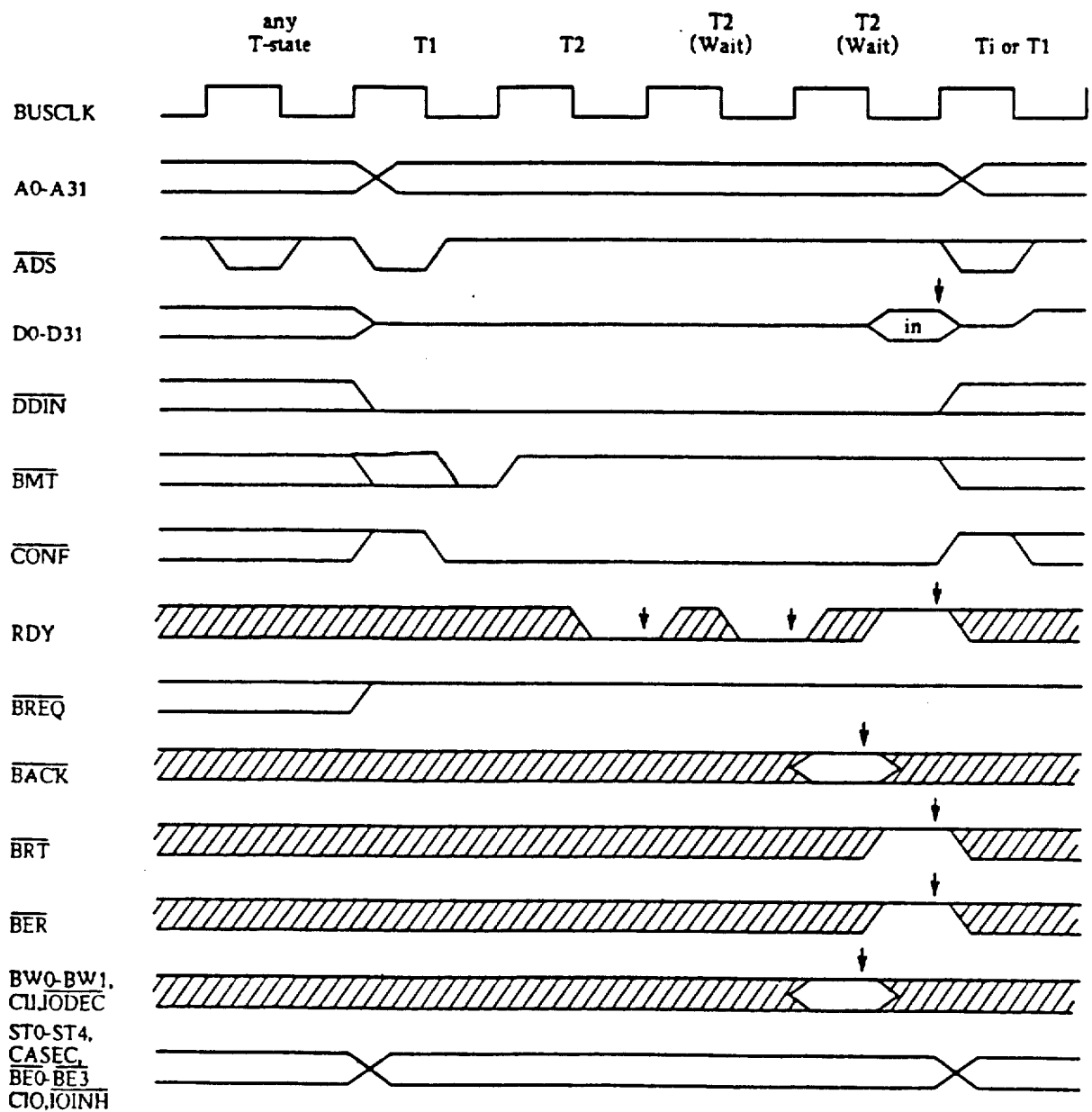
FIG. 10 is a timing diagram illustrating a read cycle extended with two wait cycles.

As shown in FIG. 10, the basic read and write bus cycles just described can be extended to support longer access times. As stated, CPU 10 samples RDY at the end of each T2 state. If RDY is inactive, then the bus cycle is extended by repeating T2 for another clock. The additional T2 states after the first are called "wait states". FIG. 10 shows the extension of a read bus cycle with the addition of two wait states.

Figure 11:
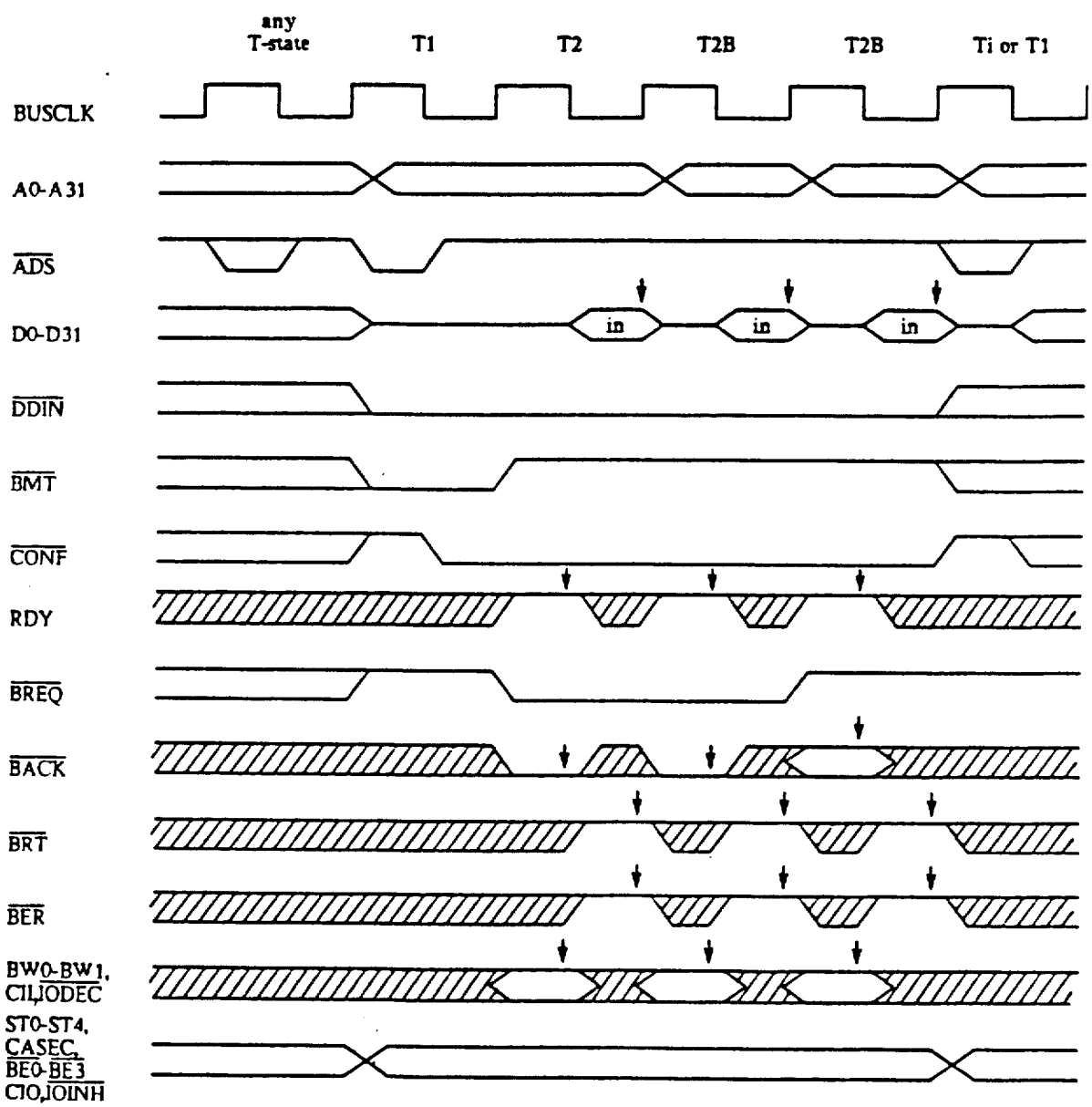
FIG. 11 is a timing diagram illustrating a burst read cycle, having three transfers, which is terminated by the microprocessor described herein.

As shown in FIG. 11, the basic read cycles can also be extended to support burst transfers of up to four double-words from consecutive memory locations. During a burst read cycle, the initial double-word is transferred during a sequence of T1 and T2 states, like a basic read cycle. Subsequent double-words are transferred during states called "T2B". Burst cycles are used only to read from 32-bit wide memories.

Figure 12:
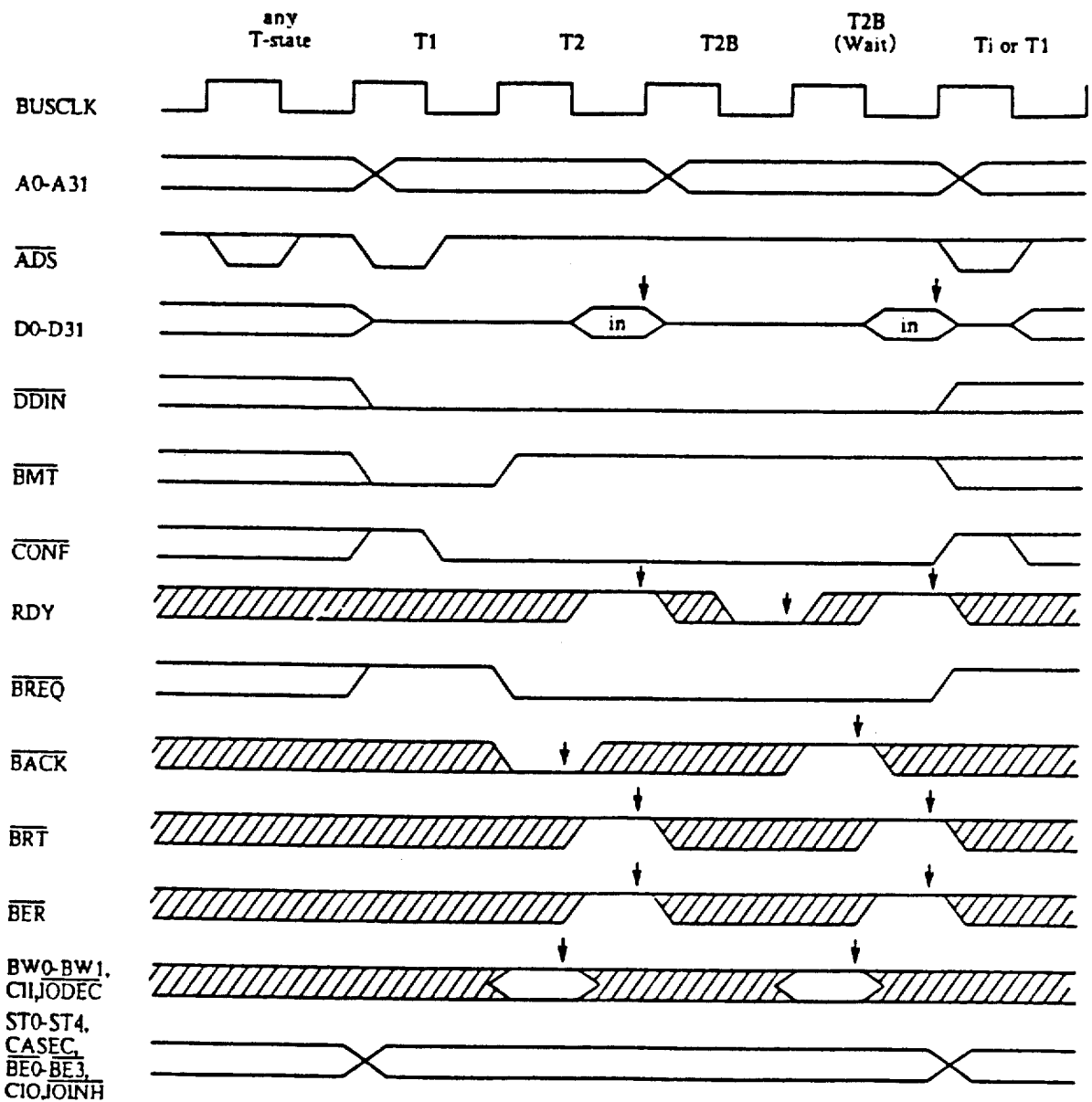
FIG. 12 is a timing diagram illustrating a burst read cycle terminated by the microprocessor described herein, the burst cycle having two transfers, the second transfer being extended by one wait state.

The number of transfers in a burst read cycle is controlled by a handshake between output signal Burst Request $\overline{\text{BREQ}}$ and input signal Burst Acknowledge $\overline{\text{BACK}}$ during a T2 or T2B state to indicate that it requests another transfer following a current one. The memory asserts $\overline{\text{BACK}}$ to indicate that it can support another transfer. FIG. 11 shows a burst read cycle of three transfers in which CPU 10 terminates the sequence by negating $\overline{\text{BREQ}}$ after the second transfer. FIG. 12 shows a burst cycle of two transfers terminated by the system when $\overline{\text{BACK}}$ was inactive during the second transfer.

For each transfer after the first in the burst sequence, CPU 10 increments address bits 2 and 3 to select the next double-word. As shown for the second transfer in FIG. 12, CPU 10 samples RDY at the end of each state T2B and extends the access time for the burst transfer if RDY is inactive.

CPU 10 provides a number of mechanisms for maintaining coherency between the two on-chip caches, i.e., Instruction Cache 14 and Data Cache 16, and external memory. These techniques are summarized in Table 5 below.

TABLE 5

|  | SOFTWARE | HARDWARE |
| --- | --- | --- |
| Inhibit Cache Access for certain locations | Cache-Inhibit bit in PTE | Cache-Inhibit input signal |
| Invalidate certain locations in Cache | CINV Instruction to invalidate block | Cache Invalidation request to invalidate set |
| Invalidate Entire Cache | CINV Instruction | Cache Invalidation request |

The coherency between the two on-chip caches and external memory may be ensured by using an external "Bus Watcher" circuit 26, shown in FIG. 1. This circuit interfaces to the following buses:

1. CPU 10 address bus and CASEC output, to obtain information on which internal cache entries (tags) are modified and to maintain updated copies of CPU 10 internal cache tags;
2. The system bus, to detect which internal memory addresses are modified; and
3. CPU 10 cache invalidation bus, consisting of the $\overline{\text{INVSET}}$, $\overline{\text{INVDC}}$, $\overline{\text{INVIC}}$ and CIA0-CIA6 signals.

Bus Watcher 26 maintains tag copies of Instruction Cache 14 and Data Cache 16 entries. If the address of a memory write cycle on the System Bus matches one of the tags inside Bus Watcher 26, a command is issued by Bus Watcher 26 to CPU 10, via the cache invalidation bus, to invalidate the corresponding entry in the appropriate internal cache. The invalidation of the internal cache entry by CPU 10 takes one clock cycle only and does not interfere with the on-going bus cycle of CPU 10. Data Cache 16 is invalidated 32 bytes at a time, while Instruction Cache 14 is invalidated 16 bytes at a time.

The cache coherency techniques implemented by CPU 10 are more fully described in copending and commonly-assigned U.S. patent application Ser. No. 006,015, "Method of Maintaining Coherence Between A Microprocesor's Integrated Cache And External Memory", filed by Shacham et al. of even date herewith, and which is hereby incorporated by reference.

To execute an instruction, CPU 10 first fetches the instruction whose address is contained in the program counter and then performs the operations for that particular instruction. After executing the instruction, the program counter is updated in one of two ways to contain the address of the next instruction to execute: either the current instruction explicitly loads the program counter (like JUMP) or it is incremented by the length of the current instruction.

Figure 13:
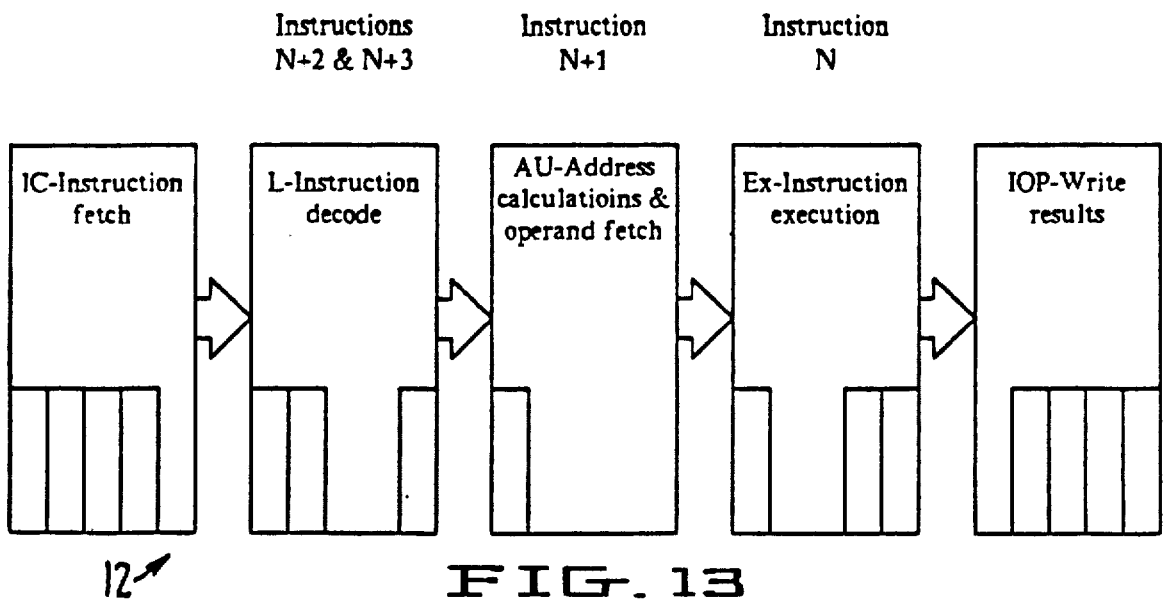
FIG. 13 is a schematic diagram illustrating the general structure of the 4-stage instruction Pipeline of the microprocessor described herein.

As stated above, CPU 10 overlaps operations to execute several instructions simultaneously in 4-stage instruction Pipeline 12. The general structure of Pipeline 12 is shown in FIG. 13. While Execution Unit 32 is calculating the results for one instruction, Address Unit 30 can be calculating the effective addresses and reading the source operands for the following instruction, and Loader 28 can be decoding a third instruction and prefetching a fourth instruction into its 8-byte queue.

Under certain circumstances, the effects of overlapped instruction execution can differ from those of strictly sequential instruction execution. More specifically, the order of memory references performed by CPU 10 may appear to differ, as explained below.

While executing an instruction, CPU 10 may read some of the source operands for the following instruction from memory before completely fetching the instruction. CPU 10, however, always completes fetching an instruction and reading its source operands before writing its results. When more than one source operand must be read from memory to execute an instruction, the operands may be read in any order. Similarly, when more than one result operand is written to memory to execute an instruction, the operands may be written in any order.

CPU 10 begins fetching an instruction only after all previous instructions have been completely fetched. However, CPU 10 may begin fetching an instruction before all the source operands have been read and results written for previous instructions.

CPU 10 begins reading the source operands for an instruction only after all previous instructions have been fetched and their source operands read. The source operand for an instruction may be read before all results of the previous instruction have been written, except when the source operand's value depends on the result not yet written. CPU 10 compares the physical address and length of the source operand with those of any results not yet written and delays reading the source operand until after writing all results on which the source operand depends.

In addition, CPU 10 identifies source operands that are located in memory-mapped peripheral ports and delays the reading of such operands until after all previous results destined for memory-mapped peripheral ports have been written. As described below, and in accordance with the present invention, special handling procedures insure that read and write references to memory-mapped I/O ports are always performed in the order implied by the program.

CPU 10 begins writing the result operands for an instruction only after all results of previous instructions have been written.

As a consequence of overlapping the operations for several instructions, CPU 10 may fetch an instruction and read its source operands, although the instruction is not executed (for example, if the previous instruction causes a trap). Nevertheless, when CPU 10 identifies that a source operand for an instruction is located in a memory-mapped peripheral port, then it will read the source operand only if the instruction is executed.

CPU 10 does not check for dependencies between the fetching of an instruction and the writing of previous instructions results. Thus, self-modifying code must be treated specially to execute as intended.

As stated above, the characteristics of certain peripheral devices and the overlapping of instruction execution in Pipeline 12 of CPU 10 require that special handling be applied to memory-mapped I/O references. I/O references differ from memory references in two significant ways, imposing the following requirements:

1. Reading from a peripheral port can alter the value read on the next reference to the same port, a characteristic referred to as "destructive-reading". For example, serial communication controllers and FIFO memories commonly operate in this manner. As explained above, CPU 10 can read the source operands for one instruction while the previous instruction is executing. Because the previous instruction may cause a trap, an interrupt may be recognized or the flow of control may be otherwise altered, it is a requirement that destructive reading of source operands in advance of executing an instruction be avoided.

2. Writing to a peripheral port can alter the value read from a different peripheral port, a characteristic referred to as "side-effects or writing". For example, before reading the counter's value from ICU 24, it is first necessary to freeze the value by writing to another control register. However, as explained above, CPU 10 can read the source operands for one instruction before writing the results of previous instructions unless the addresses indicate a dependency between the read and write references. Consequently, it is a requirement that read and write references to peripherals that exhibit side effects of writing must occur in the order that instructions are executed.

CPU 10 supports two methods for handling memory-mapped I/O. The first method, the method of the present invention, satisfies both requirements listed above and places no restriction on the location of memory-mapped peripheral devices. The second method satisfies only the requirement for side effects of writing and restricts the location of memory-mapped I/O devices, but is more efficient for devices that do not have destructive-read ports.

The method of the present invention for handling memory-mapped I/O uses two signals on the system interface. When CPU 10 generates a read bus cycle, it activates an I/O Inhibit output signal IOINH if either of the I/O requirements listed above is not satisfied. That is, CPU 10 activates IOINH if the read occurs either in advance of executing the instruction or while a write is pending from a previous instruction. Furthermore, an I/O Decode input signal IODEC is activated when the reference is to a peripheral device that implements ports with destructive-reading or side-effects of writing. When CPU 10 detects that the IODEC input signal is active while the IOINH output signal is also active, it discards the data read during the bus cycle and serializes instruction execution, as described below. CPU 10 then generates the read bus cycle again, this time satisfying the requirements for I/O and driving the IOINH output inactive.

The second method for handling memory-mapped I/O uses a dedicated region of virtual memory. CPU 10 recognizes that virtual addresses between FF000000 (hex) and FFFFFFFF (hex), inclusive, are for memory-mapped I/O. While the write is pending to a location recognized to be memory-mapped I/O, CPU 10 delays reading from any location also recognized to be memory-mapped I/O. CPU 10 may, however, read from ordinary memory locations, i.e., those with an address less than F000000 (hex), while the write is pending to a memory-mapped I/O location. Similarly, CPU 10 may read from a memory-mapped I/O location while the write is pending to an ordinary memory location.

As stated above, in certain circumstances, such as when the IODEC input and the IOINH output are both active, CPU 10 serializes instruction execution. Serializing instruction execution means that CPU 10 completes writing all previous instructions' results to memory, then begins fetching and executing the next instruction. Thus, when a new value is loaded into the program status register by executing an appropriate instruction, the new program status register value determines the privilege state used to fetch and execute the next instruction.

The Address and Execution Units 30 and 32, respectively, can process instructions at a peak rate of two cycles per instruction. Loader 28 can process instructions at a peak rate of one cycle per instruction, so it will typically maintain a steady supply of instructions to the Address Unit 30 and Execution Unit 32. Loader 28 disrupts the throughput of instruction Pipeline 12 only when a gap in the instruction stream arises due to a branch instruction or an Instruction Cache miss.

Figure 14:
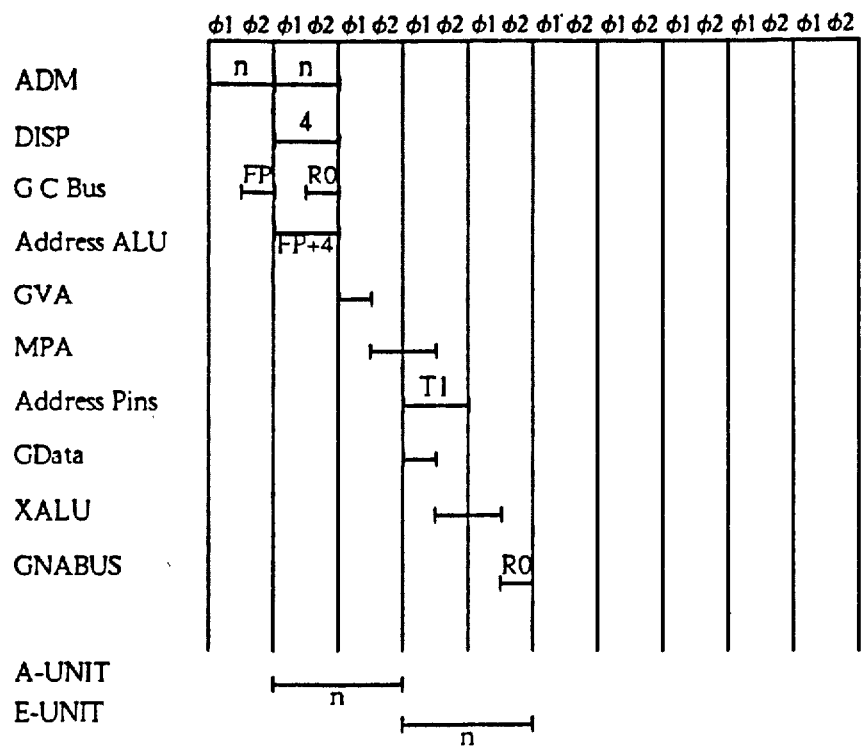
FIG. 14 is a timing diagram illustrating Pipeline timing for an internal Data Cache hit.

FIG. 14 shows the execution of two memory-to-register instructions by Address Unit 30 and Execution Unit 32. CPU 10 can sustain an execution rate of two cycles for most common instruction, typically exhibiting delays only in the following cases:

1. Storage delays due to cache and translation buffer misses and non-aligned references.

2. Resource contention between stages of instruction Pipeline 12.

3. Branch instruction and other non-sequential instruction fetches.

4. Complex addressing modes, like scaled index, and complex operations, like division.

Figure 15:
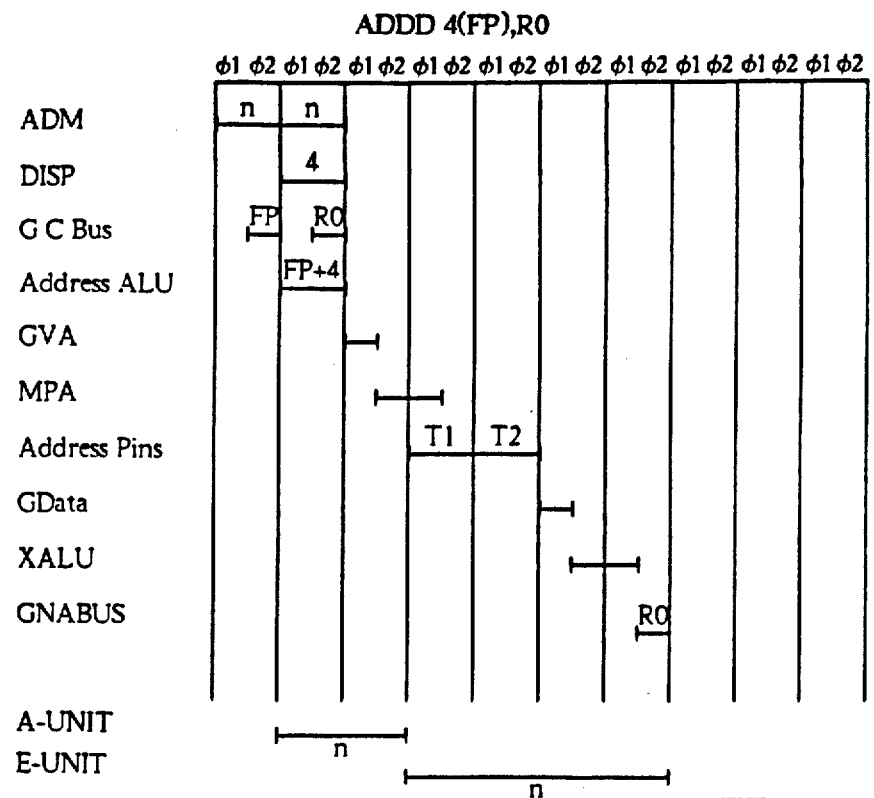
FIG. 15 is a timing diagram illustrating Pipeline timing for an internal Data Cache miss.

FIG. 15 shows the effect of a Data Cache 16 miss on the timing of Pipeline 12. Execution Unit 32 is delayed by two cycles until BIU 20 completes the bus cycles to read data.

Figure 16:
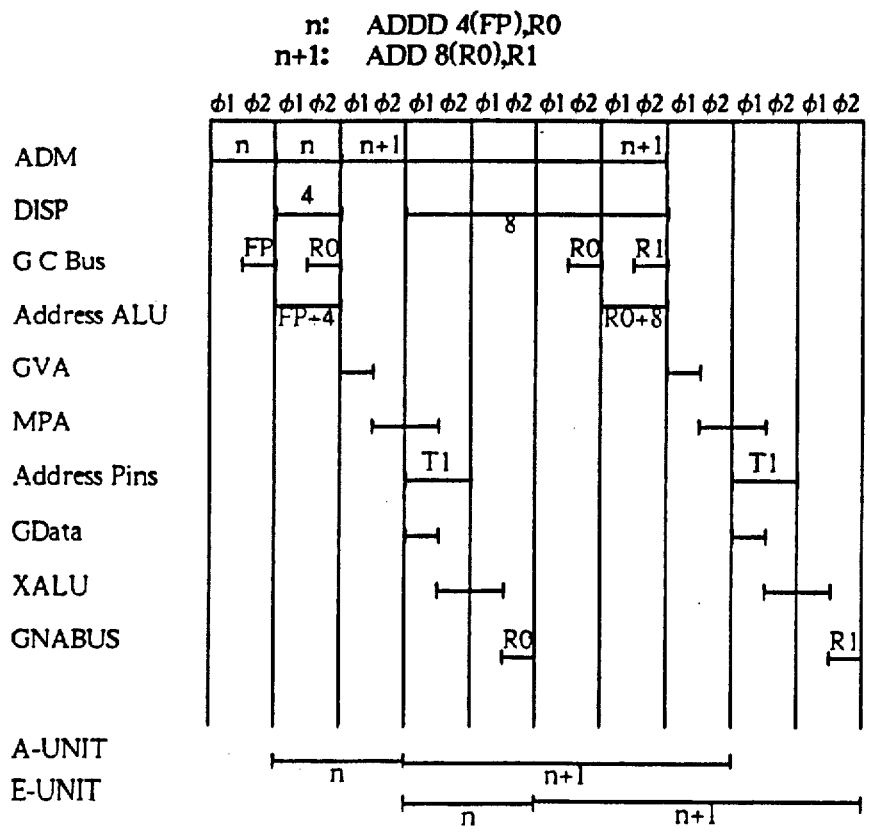
FIG. 16 is a timing diagram illustrating the effect of an address-register interlock on instruction Pipeline timing.

FIG. 16 shows the effect of an address-register interlock on the timing of Pipeline 12. One instruction is modifying a register while the next instruction uses that register for an address calculation. Address Unit 30 is delayed by three cycles until Execution Unit 32 completes the register's update. Note that if the second instruction had used the register for a data value rather than an address calculation (e.g., ADDD R0, R1), then bypass circuitry in Execution Unit 32 would be used to avoid any delay to Pipeline 12.

Loader 28 includes special circuitry for the handling of branch instructions. When a branch instruction is decoded, Loader 28 calculates the destination address and selects between the sequential and non-sequential instruction streams. The selection is based on the branch instruction condition and direction. If Loader 28 predicts that the branch instruction is taken, then the destination address is transferred to Instruction Cache 14 on the JBUS. Whether or not the branch instruction is predicted to be taken, Loader 28 saves the address of the alternate instruction stream. Later the branch instruction reaches Execution Unit 32, where the condition is resolved. Execution Unit 32 signals Loader 28 whether or not the branch instruction was taken. If the branch instruction had been incorrectly predicted, Pipeline 12 is flushed, and Instruction Cache 14 begins prefetching instructions from the correct stream.

Figure 17:
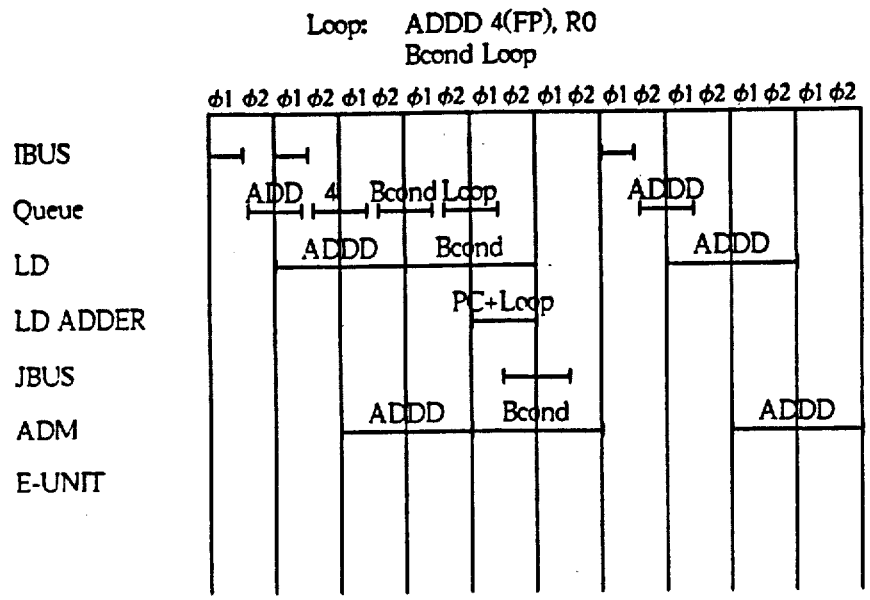
FIG. 17 is a timing diagram illustrating the effect of correctly predicting a branch instruction to be taken in the operation of the microprocessor described herein.

FIG. 17 shows the effect of correctly predicting a branch instruction to be taken. A 2-cycle gap occurs in the decoding of instructions by Loader 28. This gap at the very top of Pipeline 12 can often be closed because one fully decoded instruction is buffered between Loader 28 and Address Unit 30 and because other delays may arise simultaneously at later stages in Pipeline 12.

Figure 18:
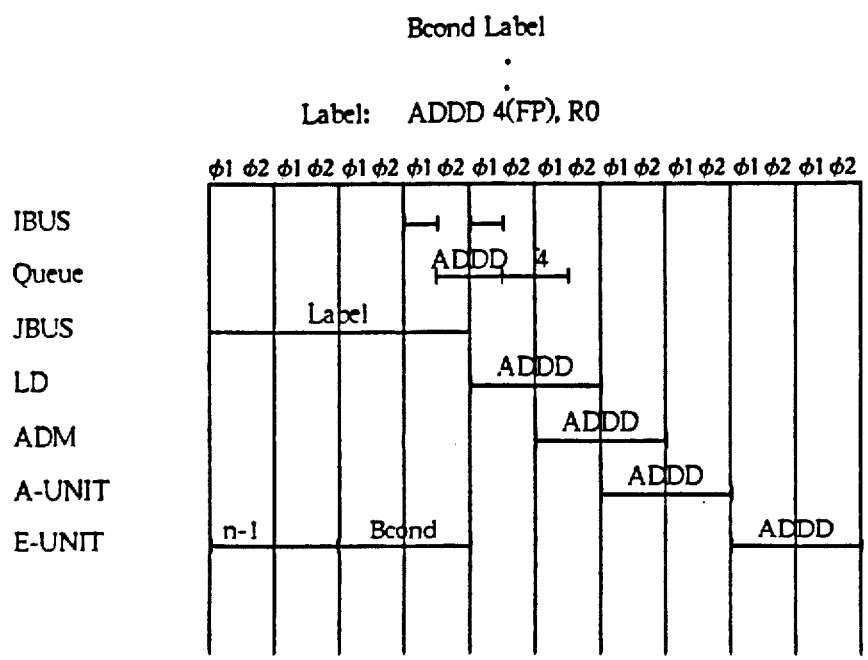
FIG. 18 is a timing diagram illustrating the effect of incorrectly predicting the resolution of a branch instruction in the operation of the microprocessor described herein.

FIG. 18 shows the effect of incorrectly predicting the resolution of a branch instruction. A 4-cycle gap occurs at Execution Unit 32.

Additional information regarding the operation of CPU 10 may be found in copending and commonly-assigned U.S. patent application Ser. No. 006,016, "High Performance Microprocessor", filed by Alpert et al of even date herewith, and which is hereby incorporated by reference.

It should be understood that various alternatives to the embodiment shown herein may be employed in practicing the present invention. It is intended that the following claims define the invention and that the structure and methods within the scope of these claims and their equivalents be covered thereby.

We claim:

1. A method of detecting and handling read references to a peripheral device by a data processing system of the type that implements pipelined instruction processing and wherein the peripheral device exhibits either "destructive reading" or "side-effects-of writing", the method comprising:

activating a first signal if the read references has occurred either in advance of executing an instruction or while a write is pending for a previous instruction;

activating a second signal if the referenced peripheral device exhibits either "destructive reading" "side-effects-of writing"; and ignoring the read reference if both the first signal and the second signal are activated.

2. A method of detecting and handling read references to a peripheral device by a data processing system that implements parallel processing of a plurality of instructions and wherein the peripheral device exhibits either "destructive reading" or "side-effects-of-writing", the method comprising (a) in response to a read reference generated by the data processing system, generating an output signal if the read reference occurs either in advance of executing an instruction or while a write is pending for a previous instruction; and (b) activating an input signal when the read reference is to a peripheral device that exhibits either "destructive reading" or "side effects of writing";

(c) identifying that both the input signal and the output signal are active;

(d) discarding data read as a result of the read reference;

(e) serializing instruction execution; and (f) regenerating the read reference while satisfying the requirements that "destructive reading" of source operands in advance of executing an instruction will not occur and read and write references to peripheral devices that exhibit "side effects of writing" will occur only in the order that instructions are executed such that the output signal is driven inactive.

3. In a data processing system that includes an instruction pipeline for implementing parallel processing of a plurality of instructions, apparatus for processing read references by the data processing system to a peripheral device that exhibits either "destructive reading" or "side-effects-of-writing", the apparatus comprising:

(a) means for activating a first signal that indicates that a read reference has been issued by the data processing system either in advance of execution of an instruction or while a write reference is pending for a previously-executed instruction;

(b) means for activating a second signal that indicates that the referenced peripheral device exhibits either "destructive reading" or "side-effects-of-writing"; and (c) means for discarding data read by the data processing system when the first and second signals are activated.

4. Apparatus as in claim 3 and further including means for serializing instruction execution by the data processing system when the first and second signals are active.

5. Apparatus as in claim 4 and further including means for regenerating the read reference when the second signal becomes inactive such that data is read from the referenced peripheral device.

* * * * *

UNITED STATES PATENT AND TRADEMARK OFFICE
CERTIFICATE OF CORRECTION

PATENT NO. : 4,802,085

DATED : January 31, 1989

INVENTOR(S) : Simon J. Levy and Donald B. Alpert

It is certified that error appears in the above - identified patent and that said Letters Patent is hereby corrected as shown below:

In Column 4, Line 31, "114" should not be bolded.

In Column 7, Lines 39-42 should be deleted and inserted after Line 46.

In Column 8, Lines 3-7 should be deleted.

In Column 16, Line 1, "references" should be --reference--.

In Column 16, Line 6, insert "or" after "reading" and before "side".

Signed and Sealed this

Twenty-fifth Day of July, 1989

*Attest:*

DONALD J. QUIGG

*Attesting Officer*   *Commissioner of Patents and Trademarks*